J. BALCANQUAL.
ASH SIFTER AND CAN.
APPLICATION FILED DEC. 31, 1913.
1,162,280.
Patented Nov. 30, 1915.
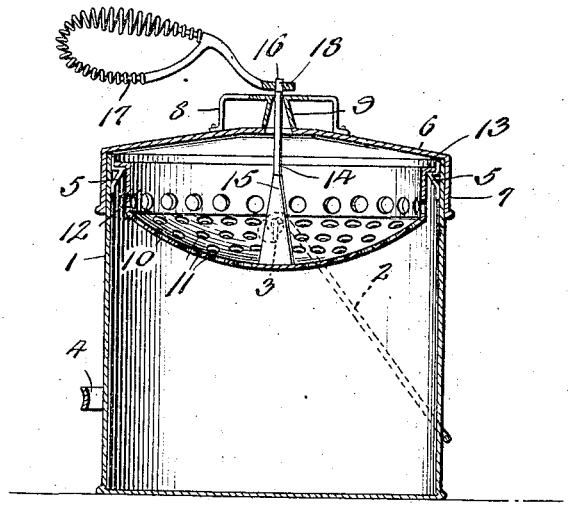
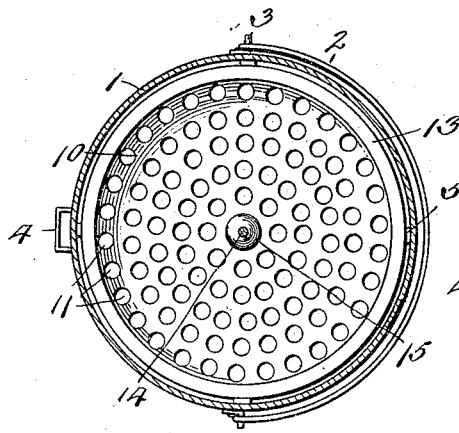
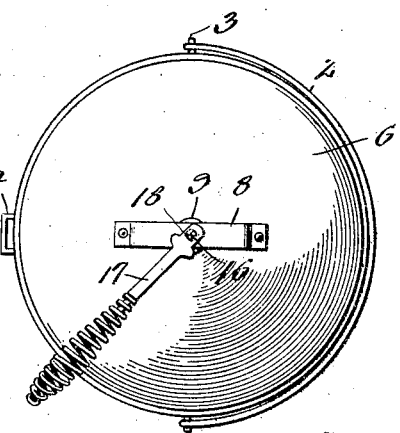
Inventor
J. Balcanqual,
By Victor J. Evans
Attorney
Witnesses

UNITED STATES PATENT OFFICE.

JOHN BALCANQUAL, OF POUGHKEEPSIE, NEW YORK.

ASH SIFTER AND CAN.

1,162,280.   Specification of Letters Patent.   Patented Nov. 30, 1915.

Application filed December 31, 1913. Serial No. 809,674.

*To all whom it may concern:*

Be it known that I, JOHN BALCANQUAL, a subject of the King of Great Britain, residing at Poughkeepsie, in the county of Dutchess and State of New York, have invented new and useful Improvements in Ash Sifters and Cans, of which the following is a specification.

This invention is an improved ash sifter and can, the object of the invention being to provide an improved device of this character by means of which ashes may be readily sifted without permitting the ashes to become dispersed in the air and to settle on nearby objects and by means of which the cinders may be readily removed from the sifter for use, and the ashes conveniently carried to a place of deposit, one specific object of the invention being to provide an improved form of sifter and means for carrying the same, another specific object being to provide an ash can with a removable cover to which the sifter may be connected for use so that the sifter with the cinders therein may be readily lifted, together with the cover, from the can, and so that the sifter may then be detached from the cover and emptied of its contents.

The invention consists in the construction, combination and arrangement of devices hereinafter described and claimed.

In the accompanying drawings:—Figure 1 is a vertical central sectional view of an ash sifter and ash can constructed in accordance with my invention. Fig. 2 is a horizontal sectional view of the same. Fig. 3 is a plan of the same.

The can 1 is here shown as of cylindrical form, provided with a bail 2 pivotally connected to lugs 3 on opposite sides of the can, the can being further provided, on one side, with a handle 4, to facilitate the tipping and emptying thereof. Within the can, near its upper end, are a series of supporting brackets 5, which are suitably spaced apart.

A cover 6 is provided for the can, the cover having a depending flange wall 7 to fit snugly around the upper portion of the can, to close the latter, and yet adapt the cover to be readily removed from the can when desired. On the upper side of the cover, at its center, is an arched handle 8. A frusto-conical bearing 9 is also provided, the lower end of which is secured to the center of the cover and the upper end of which is secured under the center of the handle 8.

The sifter 10 is substantially pan-shaped and is here shown as made of sheet metal and provided in its bottom with openings 11 of suitable size. The wall 12 of the sifter is provided at its upper side with an outstanding annular flange 13, to bear on the brackets 5 and thus support the sifter in the upper portion of the can and adapt the sifter to be readily turned, first in one direction and then in the reverse direction for operation. In the center of the sifter is a shaft 14 the lower end of which extends through and is secured to the bottom of the sifter and around the lower portion of the shaft is a bracing and supporting cone 15. The shaft extends above the cone 15 and its upper portion, when the sifter is in place on the brackets 5 in the can is adapted to pass through the bearing 9 and to project above the handle 8. The upper end of the shaft is flattened on opposite sides to form a projection 16 of non-circular form.

I also provide a handle or lever 17 which may be of the form here shown or of any other suitable form and in practice is pivotally made in the form of an ordinary stove lid lifter and is provided with an opening 18 adapted to receive the projection 16 of the sifter shaft. The conical bearing 9 facilitates the placing of the cover on the can, after the sifter has been arranged in the can and on the brackets. It will be understood that the sifter will be filled with ashes after being placed in the can, the cover is then placed on the top of the can, the handle 17 is connected to the upper end of the sifter shaft, and is employed to turn the sifter first in one direction and then in the reverse direction and thereby cause the ashes to be sifted from the cinders and to fall into the can. The lever handle 17 may then be unshipped from the sifter shaft, the cover removed, and the sifter may then be removed from the can and emptied of its contents of cinders and the can may be conveniently used to carry the ashes to a convenient place of deposit.

Having thus described my invention, I claim:—

In combination with a can having supports on its inner side, near its upper end, a sifter arranged in the can and having an outwardly extending annular flange at its upper side bearing on said supports, whereby said sifter is suspended by the supports and wholly supported thereby, a vertical centrally arranged shaft extending up from the bottom of the sifter, a cover for the can having a bearing for said shaft and a lever handle adapted to be connected to the upper end of the sifter shaft and for operating the sifter, the sifter shaft co-acting with the bearing to hold the sifter concentric with the can and facilitate movement of the sifter on the supports from which it is suspended, said bearing in the can cover being conical in form and said cover also having a handle through the center of which said conical bearing extends.

In testimony whereof I affix my signature in presence of two witness

JOHN B. CANQUAL.

Witnesses:
GEORGE OVEROCKER,
ALBERT H. KLEBES.